Patented Nov. 24, 1931

1,833,526

UNITED STATES PATENT OFFICE

WILLIAM R. LAMS AND JOSEPH A. WYLER, OF ALLENTOWN, PENNSYLVANIA, ASSIGNORS TO TROJAN POWDER COMPANY, A CORPORATION OF NEW YORK

NITROSTARCH LACQUER COMPOSITIONS

No Drawing.   Application filed April 30, 1928.   Serial No. 274,156.

Our invention relates to improvements in nitrostarch lacquer compositions and more particularly relates to improved means for obtaining clear, homogeneous and non-separating lacquers comprising nitrostarch and nitrocellulose. The principal object of our present invention is to provide an improved lacquer containing both nitrostarch and nitrocellulose, which will not segregate or separate upon standing.

In an application for patent filed on January 18, 1928, and which has been given Serial Number 247,743, Walter O. Snelling and William R. Lams have described a new type of lacquer, having superior properties to the present commercial nitrocellulose or pyroxylin lacquers, this new type of lacquer having a double base and containing both nitrostarch and nitrocellulose, and being distinguished by very superior properties of adherence to smooth surfaces, as compared with the customary nitrocellulose lacquers of commerce.

We have discovered that when a solution of nitrostarch in a suitable solvent such as ethyl acetate for example is mixed with a similar solution of nitrocellulose in ethyl acetate, and the two clear solutions are then mixed together, incompatibility as evidenced by immiscibility and ultimate separation into two distinct layers occurs. Although lacquers such as described by Snelling and Lams possess very superior properties as compared with commercial nitrocellulose lacquers, it is necessary to thoroughly mix or stir such double base lacquers that have stood for any long period of time, in order to obtain a homogeneous product. In the case of the so-called "ready mixed" lacquers, which are distributed to the trade in cans and which may remain in stock, in exceptional cases for months or years, it is particularly desirable to prevent any separation or lack of homogeneity in the lacquer, as otherwise the lacquer may be applied by the user, without any effort to stir the material, with consequent unsatisfactory results.

Upon discovering that lacquers containing both nitrocellulose and nitrostarch thus tend to separate into distinct layers with corresponding lack of homogeneity we sought for means for preventing such separation, and as a result of a long series of experiments we have discovered certain chemical agents which, when added to a mixture of solutions of nitrocellulose and nitrostarch in any suitable solvent or mixture of solvents tend to cause the solutions to become miscible after a time forming a single layer without subsequent separation into two layers. The most efficient homogenizer which we have discovered is sodium palmitate, but we have also found that other alkali metal palmitates, and particularly potassium palmitate, show somewhat similar action. We have also discovered that an alkali metal formate shows similar homogenizing action, although not to the same extent as the alkali metal palmitates. Still other materials which we may use as homogenizing agents are aniline hydrochloride, aniline acetate, and para-amido-acetanilide.

Throughout this application "homogeneous solution" refers to a mixture in solution of materials which result in a completely miscible solution or to a mixture of solutions which exhibit mutual solubility. The words "homogeneity", "homogenizers" and "homogenizing" used herein are to be interpreted with limitations similar to those which are imposed in the foregoing definition of "homogeneous".

As an example of our present invention we may dissolve 25 parts of nitrostarch and 50 parts of nitrocellulose in an equal weight, or 75 parts by weight, of ethyl acetate. This mixture upon standing will, after a time, show a separation into two components, one of which will consist predominantly of nitrostarch in solution in ethyl acetate, while the other will consist predominantly of nitrocellulose in solution in ethyl acetate. We have discovered that if, to such a mixture of 25 parts of nitrostarch and 50 parts of nitrocellulose in 75 parts of ethyl acetate, there is added for example, 3.75 parts of sodium palmitate, some action of unknown nature occurs, as a result of which an entirely homogeneous and non-separating mixture occurs. The homogenizing action is very slow, and may require from three to five weeks to become complete, although the action can be hastened somewhat by employing a slightly elevated temperature, and by frequently stirring the mixture.

It will of course be understood that the example given is for purpose of illustration only, and that our invention is broadly applicable to the treatment of solutions containing both nitrostarch and nitrocellulose, in a wide variety of solvents. We may employ any of the solvents commonly used in lacquer formulation, and we may employ any of the homogenizing agents herein described, as means for promoting the homogenization of the nitrocellulose and the nitrostarch solutions.

In the practice of our invention we prefer to add, to any lacquer solution comprising both nitrocellulose and nitrostarch, a quantity of homogenizer equal to approximately 5% of the combined weight of the nitrostarch and the nitrocellulose upon a dry basis. Although we prefer to employ sodium palmitate as our homogenizing agent, we may also employ sodium formate, aniline hydrochloride, aniline acetate, and para-amidoacetanilide. It will of course be evident that the customary gums, stabilizers, plasticizers, and pigments may be present in lacquers containing both nitrostarch and nitrocellulose, and our invention of employing a homogenizing agent to prevent the separation of nitrocellulose and nitrostarch from double base lacquers may be broadly applied to any lacquer composition in which nitrostarch and nitrocellulose are present in dissolved condition as film-forming components.

We claim:

A lacquer comprising nitrocellulose and nitrostarch and an agent selected from the group consisting of alkali metal palmitates, sodium formate, aniline hydrochloride, aniline acetate, and para-amido acetanilide.

In testimony whereof, we have hereunto subscribed our names this 28th day of April, 1928.

WILLIAM R. LAMS.
JOSEPH A. WYLER.